US008777248B2

(12) United States Patent
Perri et al.

(10) Patent No.: US 8,777,248 B2
(45) Date of Patent: Jul. 15, 2014

(54) MOTOR-VEHICLE SUSPENSION SYSTEM WITH TRANSVERSE CONTROL ARMS AND CENTRAL LEAF SPRING CONNECTING THE ARMS

(71) Applicant: Fiat Group Automobiles S.p.A., Turin (IT)

(72) Inventors: Eugenio Perri, Turin (IT); Bruno Martina, Turin (IT)

(73) Assignee: Fiat Group Automobiles S.p.A., Turin (IT)

(*) Notice: Subject to any disclaimer, the term of this patent is extended or adjusted under 35 U.S.C. 154(b) by 0 days.

(21) Appl. No.: 13/743,531

(22) Filed: Jan. 17, 2013

(65) Prior Publication Data

US 2013/0241167 A1 Sep. 19, 2013

(30) Foreign Application Priority Data

Mar. 14, 2012 (EP) .................................... 12159463

(51) Int. Cl.
*B60G 11/08* (2006.01)

(52) U.S. Cl.
USPC .................................................. 280/124.171

(58) Field of Classification Search
USPC ...................... 280/124.17, 124.171, 124.175
See application file for complete search history.

(56) References Cited

U.S. PATENT DOCUMENTS

| | | | | |
|---|---|---|---|---|
| 4,313,618 | A * | 2/1982 | Robinson | 280/124.134 |
| 5,184,842 | A | 2/1993 | Stockton | |
| 8,485,543 | B2 * | 7/2013 | Richardson et al. | 280/124.171 |

FOREIGN PATENT DOCUMENTS

| | | |
|---|---|---|
| DE | 24 51 671 | 5/1976 |
| FR | 2 607 449 | 6/1988 |
| FR | 2 832 098 | 6/2003 |

OTHER PUBLICATIONS

Search Report for EP 12159463.4 dated Jul. 5, 2012.

* cited by examiner

*Primary Examiner* — Faye M. Fleming
(74) *Attorney, Agent, or Firm* — Nixon & Vanderhye P.C.

(57) ABSTRACT

A motor-vehicle suspension system comprises, for each wheel, at least one transverse control arm having an outermost end articulated to a respective wheel support and an innermost end articulated to the frame of the motor vehicle. A transverse leaf spring is set centrally between the two transverse arms, and has its ends connected to the innermost ends of the transverse arms. The connection of each transverse arm to the leaf spring is such as to enable oscillations of the transverse arm in a substantially horizontal plane with respect to the leaf spring and minor relative sliding between the connected ends of the arm and the leaf spring in the longitudinal direction of the leaf spring.

23 Claims, 8 Drawing Sheets

MOTOR-VEHICLE SUSPENSION SYSTEM WITH TRANSVERSE CONTROL ARMS AND CENTRAL LEAF SPRING CONNECTING THE ARMS

This application claims priority to EP Patent Application No. 12159463.4 filed 14 Mar. 2012, the entire content of which is hereby incorporated by reference.

FIELD OF THE INVENTION

The present invention relates to motor-vehicle suspension systems, of the type comprising, for each wheel, at least one transverse control arm having an outermost end connected in an articulated way to a respective wheel support and an innermost end connected in an articulated way to a supporting structure of the vehicle (for example, directly to the body or to the frame of the vehicle, or to an auxiliary frame, which is in turn rigidly or elastically connected to the body) in such a way that each transverse arm guides the vertical movements of the respective wheel support by means of an oscillation in a plane that is substantially transverse with respect to the longitudinal direction of the motor vehicle, said suspension system further comprising spring means that counter the vertical movements of the two wheel supports, constituted by a leaf spring set transversely with respect to the longitudinal direction of the motor vehicle.

A suspension system of the type referred to above is, for example, described and illustrated in the document No. FR-A-2 832 098. In said known system, the aforesaid leaf spring is preferably made of composite material and has its opposite ends connected to the two wheel supports. The central part of the leaf spring is connected to the structure of the motor vehicle. Said known solution is not fully satisfactory and entails drawbacks both from the standpoint of efficiency and reliability of operation and from the standpoint of simplicity of construction.

A further solution already proposed is illustrated in FIG. 1 of the annexed drawings. It envisages a leaf spring made of composite material that integrates the two bottom transverse arms of the suspension. With reference to FIG. 1, the reference number 1 designates the suspension system as a whole, comprising wheel supports 2 having top attachments connected to respective shock absorbers 3 with functions of guide of the wheel support, according to the McPherson scheme.

The two wheel supports 2 have at their bottom ends attachments 4 for the articulated connection of the two opposite ends of a leaf spring 5 set transversely with respect to the longitudinal direction A of the motor vehicle. The leaf spring 5 is made of composite material comprising a synthetic matrix including reinforcement fibers, in particular glass fibers.

The leaf spring 5 has an elongated body with rectangular cross section. Each end of the leaf spring 5 is gripped by means of a screw 6 between two plates 7 of a U-shaped bracket 8 connected in an articulated way on the bottom attachment 4 of the wheel support 2. In its central area, the leaf spring 5 is connected to a supporting frame 9 that is rigidly or elastically secured to the frame or body of the motor vehicle, by means of a pair of vice attachments 10 set apart from one another, arranged symmetrically at the two sides of the central part of the leaf spring 5. The attachments 10 grip two cylindrical half-shells made of rubber and metal with function of elastic bushing with longitudinal axis.

In the known solution of FIG. 1, the leaf spring incorporates in its structure the two bottom transverse arms and, with its end portions performs the functions of said transverse arms. At the same time, the entire leaf spring functions as elastic element designed to counter the vertical movements of the wheel supports. The articulated connection on the attachments 4 and 10 is obtained with the use of bushings made of elastomeric material, which enable minor movements and relative rotations between the attachments 4 and 10 and the respective portion of the leaf spring 5.

The known solution of FIG. 1, albeit presenting the advantage of a good degree of lightness and of a simple structure, with consequent reduction of the production costs, presents, however, some drawbacks that limit the efficiency and possibilities of application thereof. Said drawbacks comprise in particular:

a) a relative complexity of construction of the central attachments 10, which envisage fixings set at distances apart and sturdy structures for containing the elements made of rubber having the function of bushing with axis parallel to the longitudinal direction of the vehicle in order to prevent interruption of the continuity of the reinforcement fibers of the leaf spring 5 and which must moreover achieve the following targets:

- enable rotation of the end portions of the leaf spring 5 that guide the vertical displacements of the wheel supports 2; and
- react to the road loadings with differentiated stiffnesses in the vertical and transverse/longitudinal direction of the motor vehicle;

b) problems of structural resistance of the end portions of the leaf spring, which function as transverse control arms, in particular in the case of very high end loads (such as, for example, in the lateral impact against a step) together with deformations of bending in the vertical plane of the leaf spring;

c) problems of a functional nature, since the leaf spring must enable longitudinal movements of the wheels (for example, in overcoming an obstacle) through the deformation of bending in the horizontal plane, without, however, giving rise to a moment of reaction in so far as this would reduce the longitudinal flexibility of the suspension, at the expense of travelling comfort;

d) problems of encumbrance in so far as the conformation of the leaf spring prevents, in the design configuration, an inclination in the horizontal plane of its ends, with drawbacks for the elasto-kinematic characteristics of the suspension and the compatibility with the space occupied by other objects (for example, in the case of rear suspension, the rear differential in a motor vehicle with rear-wheel drive or four-wheel drive); and e) possible interactions between lateral loads, which act along the axis of the leaf spring, and springing loads, with effects of stiffening of the suspension.

OBJECT OF THE INVENTION

The object of the present invention is to provide a suspension system having the characteristics referred to at the start of the present description, which will be able to overcome the aforesaid drawbacks.

SUMMARY OF THE INVENTION

With a view to achieving said object, the subject of the invention is a motor-vehicle suspension system, comprising, for each wheel, at least one transverse control arm having an outermost end connected in an articulated way to a respective wheel support and an innermost end connected in an articulated way to a supporting structure of the motor vehicle in such a way that each transverse control arm guides the vertical movements of the respective wheel support by means of an oscillation in a plane that is substantially transverse with respect to the longitudinal direction of the motor vehicle, said system further comprising spring means that counter the vertical movements of the two wheel supports, constituted by a leaf spring set transversely with respect to the longitudinal direction of the motor vehicle and constituting a unit separate from said transverse control arms, said suspension being characterized in that the leaf spring is set centrally between said transverse control arms, with the ends of the leaf spring connected to the innermost ends of said arms in such a way that the oscillations of the transverse arms in the aforesaid plane that is substantially transverse cause a deformation of bending of the leaf spring; the connection of each transverse arm to the leaf spring being such as to enable a rotation of the transverse arm in a substantially horizontal plane with respect to the leaf spring and a relative sliding between the connected ends of the arm and of the leaf spring in the longitudinal direction of the leaf spring.

In a preferred embodiment, the aforesaid transverse arms have their ends connected in an articulated way to the respective wheel support and to the supporting structure of the motor vehicle about axes substantially parallel to the longitudinal direction of the motor vehicle, with the aid of elastic bushings that enable minor angular oscillations principally about the axis of the bushing and relative displacements along axes directed transversely to the axis of the bushing.

Once again in the case of the aforesaid preferred embodiment, the ends of the leaf are connected to the innermost ends of the arms each with the aid of a connection screw with substantially vertical axis so as to provide a fixed joint between the arms and the leaf spring with respect to the movements of oscillation of the arms that bring about bending of the leaf spring, at the same time allowing a relative rotation between the arms and the leaf spring about the axes of said connection screws, without generation of a moment of reaction.

Once again in the case of the preferred embodiment, each of said connection screws between the leaf spring and the transverse arms engages corresponding holes made in the respective arm and in the leaf spring, at least one of said holes being elongated in the longitudinal direction of the leaf spring to allow minor relative sliding in said direction between the connected ends of each arm and of the leaf spring.

In the preferred embodiment, the leaf spring is constituted by a single body made of composite material, comprising a matrix of synthetic material including reinforcement fibers, for example, glass fibers. The two transverse arms that are connected together by the leaf spring are, instead, preferably made of metal material, in particular aluminium and are preferably obtained by extrusion (even though the possibility of adopting a process of die-casting or forging is not ruled out) so that they can be obtained with a configuration that reduces as far as possible the weight of said arms without jeopardizing the desired characteristics of stiffness.

Thanks to all the aforesaid characteristics, the system according to the invention enables the drawbacks of the known art to be overcome and presents in particular the following advantages:

a) the elastic articulations of the transverse arms to the wheel supports and to the supporting structure of the motor vehicle may be altogether identical to the ones used for the transverse arms of conventional suspensions and can envisage conventional elastic bushings mounted within cylindrical seats made in the ends of the transverse metal arms;

b) the kinematic and structural function envisaged for the suspension is performed by the metal control arms, in a way altogether analogous to conventional transverse arms, with the addition of springing loads in the vertical plane withstood with appropriate sizing of the resistant sections of the arms, designed accordingly;

c) the use of an anti-friction coupling between the end of the leaf spring and the control arms enables complete decoupling of the longitudinal movements of the wheel, which entail rotation in the horizontal plane of the transverse arms, from the deformation of bending of the leaf spring in the horizontal plane, as a result of rotation of the transverse arms about the axis of the aforesaid connection screws between the arms and the leaf spring, without significant moments of reaction, and hence without any conditioning that penalizes the travelling comfort in the case where the vehicle has to overcome obstacles;

d) the coupling with a vertical screw between each end of the leaf spring and the respective transverse arm enables creation of permanent inclinations in the horizontal plane between the transverse arms and the leaf spring, without any moment of reaction, enabling elasto-kinematic optimization of the geometry of the suspension and compatibility with the spaces occupied by other objects, for example, due to the presence of a differential in the case where the suspension is a rear suspension used in a motor vehicle with rear-wheel drive or four-wheel drive;

e) the movements of deflection of the leaf spring in the vertical plane are absolutely uncoupled from the loads acting along the axis of the transverse arms, thus rendering the vertical stiffness of the suspension independent of the lateral loads applied in the plane of the road; moreover, the sizing of the leaf spring does not need to take into account the end loads on the arms, which are discharged directly on the connections articulated to the supporting structure of the motor vehicle.

Consequently, in general, the suspension system according to the invention maintains the advantages of simplicity of construction and of lightness of the known solution illustrated in FIG. 1 of the annexed drawings, avoiding the use of helical springs with the corresponding interfaces (cups, elastic rings) as well as the use of a stabilizer bar, said helical springs and said stabilizer bar being replaced altogether by the leaf spring. Thanks, however, to the use of kinematic and structural elements distinct from the elastic element (transverse control arms constituted by elements that are independent of the leaf spring), the function of the components and the construction of the articulations to the frame is simplified (unlike what occurs in the case of the known solution of FIG. 1), said articulations possibly being altogether conventional so as to reduce the costs for design and production, at the same time increasing the flexibility of application of the suspension, which can be used in various types of motor vehicle, both as rear suspension and as front suspension.

The suspension system according to the invention moreover achieves the following further advantages:

- containment of the dimensions and of the cost of the elastic bushings used in the articulated connections, which can be altogether conventional, with consequent simplification also of the elements that interface with said bushings (suspension uprights, vehicle frame);
- simplification of the structural function of the leaf spring, with advantages as regards the dimensions and cost of the component;
- possibility of adjusting the wheel convergence by providing a cam device associated to the articulated connections of the transverse arms to the supporting structure of the motor vehicle, thanks to the provision of the connection between the transverse arms and the leaf spring, with the possibility of relative displacements in the longitudinal direction of the arms (the leaf spring remains stationary whilst each transverse arm can be translated in its longitudinal direction, i.e., transversely with respect to the longitudinal direction of the vehicle, so as to adjust the convergence of the wheels on the production line, adapting it to the design value);

elimination of a rigid connection between the two wheels, which can steer independently as a result of the lateral loads of the road, enabling the convergences under load of the suspension to be adjusted independently in order to improve the handling performance of the motor vehicle.

BRIEF DESCRIPTION OF THE FIGURES

Further characteristics and advantages will emerge from the ensuing description with reference to the annexed drawings, which are provided purely by way of non-limiting example and in which.

DETAILED DESCRIPTION OF THE INVENTION

Figure 1:
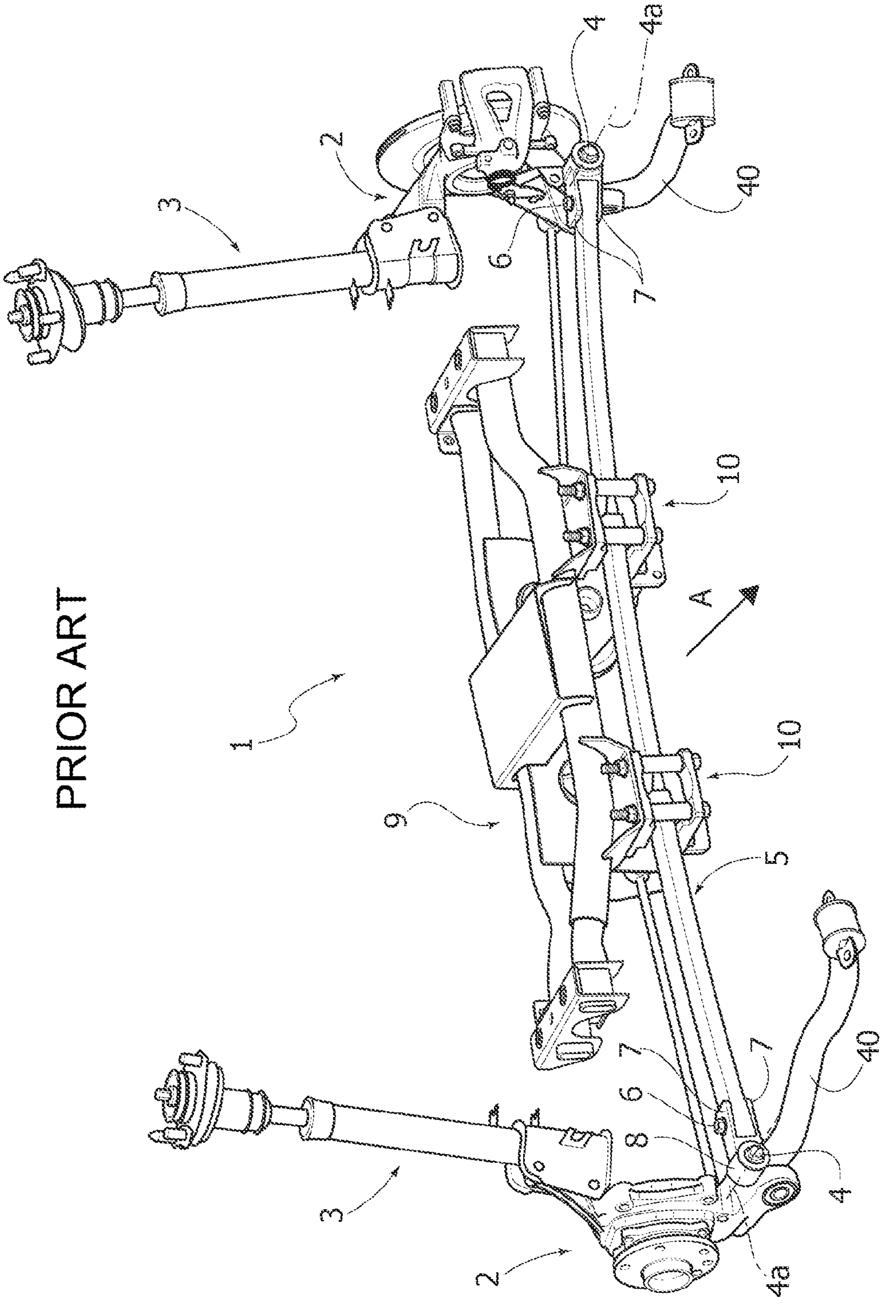
FIG. 1 is a schematic perspective view of a solution according to the known art, already described above.

In FIGS. 2-5, the parts that are in common with those of the known suspension system illustrated in FIG. 1 are designated by the same reference numbers.

The example of suspension illustrated in FIGS. 2-5 regards, as does that of FIG. 1, a rear suspension of a motor vehicle for transport of persons, but could also be adopted for a commercial vehicle.

As already discussed above, the system according to the invention is distinguished from the known system illustrated in FIG. 1 in that it envisages distinct elements to perform the kinematic and structural function and the elastic function. In this case, in fact, two bottom transverse control arms 50 are provided, constituted by elements distinct from a leaf spring 51 that connects said arms.

Figure 2:
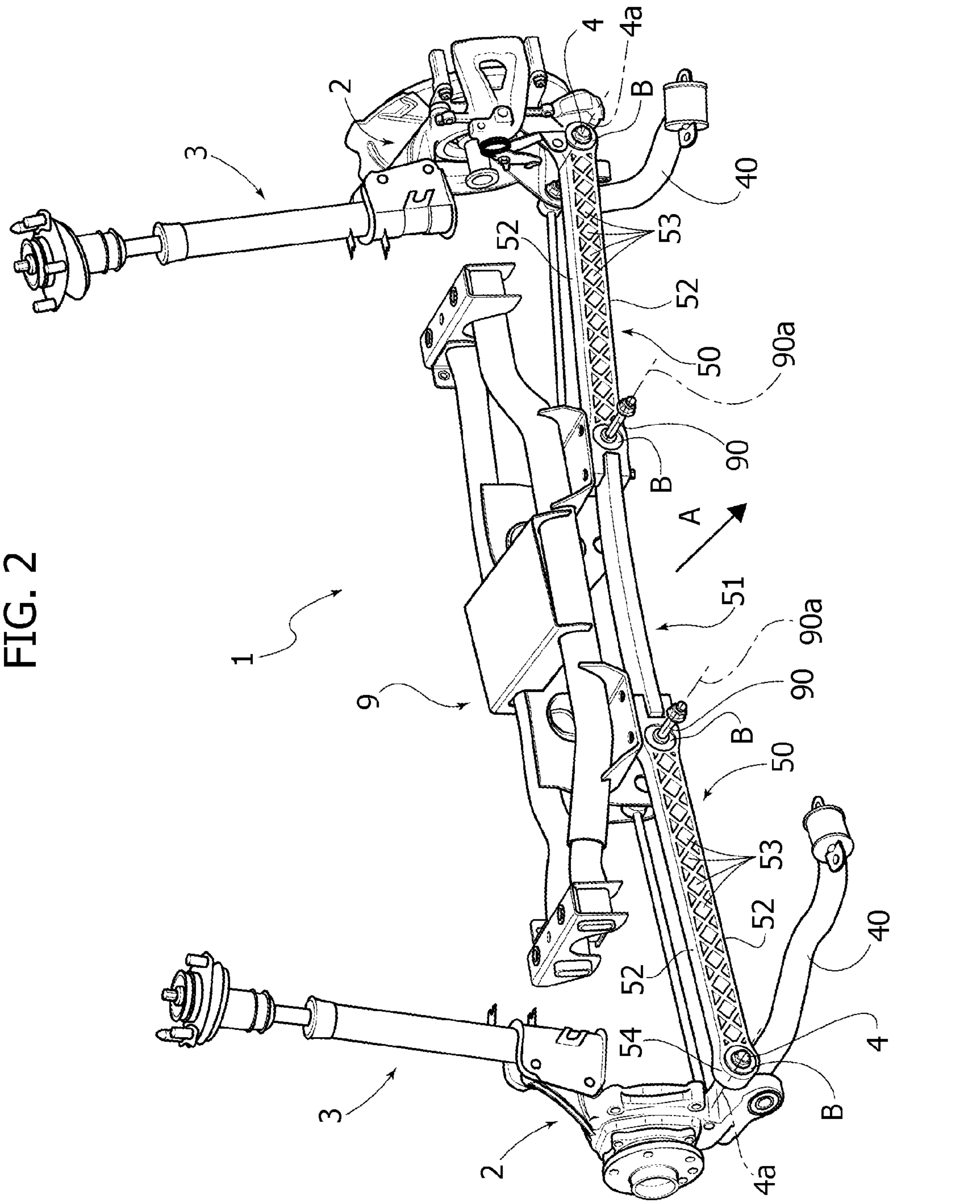
FIG. 2 is a schematic perspective view of a preferred embodiment of a suspension system according to the invention.

FIG. 2 shows an example in which the innermost ends of the two bottom transverse arms 50 are connected in an articulated way to a frame designated as a whole by 9, which is in turn secured rigidly or elastically to the body or to the frame of the motor vehicle. It is evident, however, that the principles of the present invention apply also in the case where the arms 50 are connected in an articulated way directly to the load-bearing structure of the motor vehicle (body or frame).

With reference to the example illustrated in the drawings, each transverse arm 50 is constituted by an aluminium element obtained by extrusion, having a substantially rectangular cross section, with mutually parallel plane top and bottom walls 52. The arms 50 have a series of through openings for lightening 53 defined by a plurality of diaphragms set crossing one another made of a single piece obtained by extrusion in the element constituting each arm 50. The openings for lightening 53 extend in a direction parallel to the longitudinal direction A, from the front face to the rear face of the arm 50. Thanks to said specific structure and conformation, each arm 50 has a weight reduced to the minimum, albeit guaranteeing the necessary characteristics of stiffness and resistance to stresses.

At each end, each arm 50 has a widened head 54 of a circular shape, mounted within which is an elastic bushing B of any known type, for articulated connection of the arm, respectively, to the attachment 4 carried at the bottom by the respective wheel support 2 (about an axis 4*a*) and to a threaded pin 90 secured to the supporting frame 9 (about an axis 90*a*), the axes 4*a*, 90*a* of said articulated connections being substantially parallel to the longitudinal direction A of the motor vehicle.

Of course, the specific conformation of the transverse control arm 50 that has been described above is here provided purely by way of example, it being evident that each transverse arm could also be made of another material (metal or non-metal) and with a configuration also different from the one described here.

Figure 3:
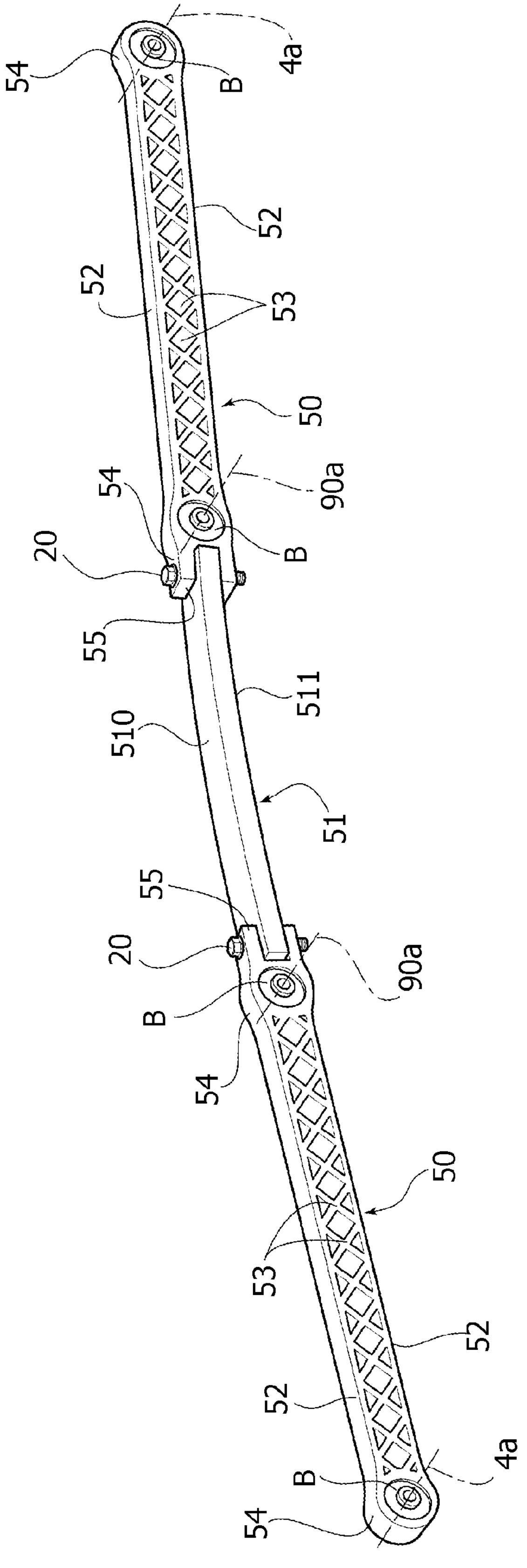
FIG. 3 is a perspective view at an enlarged scale of a component of the suspension system of FIG. 2.
Figure 4:
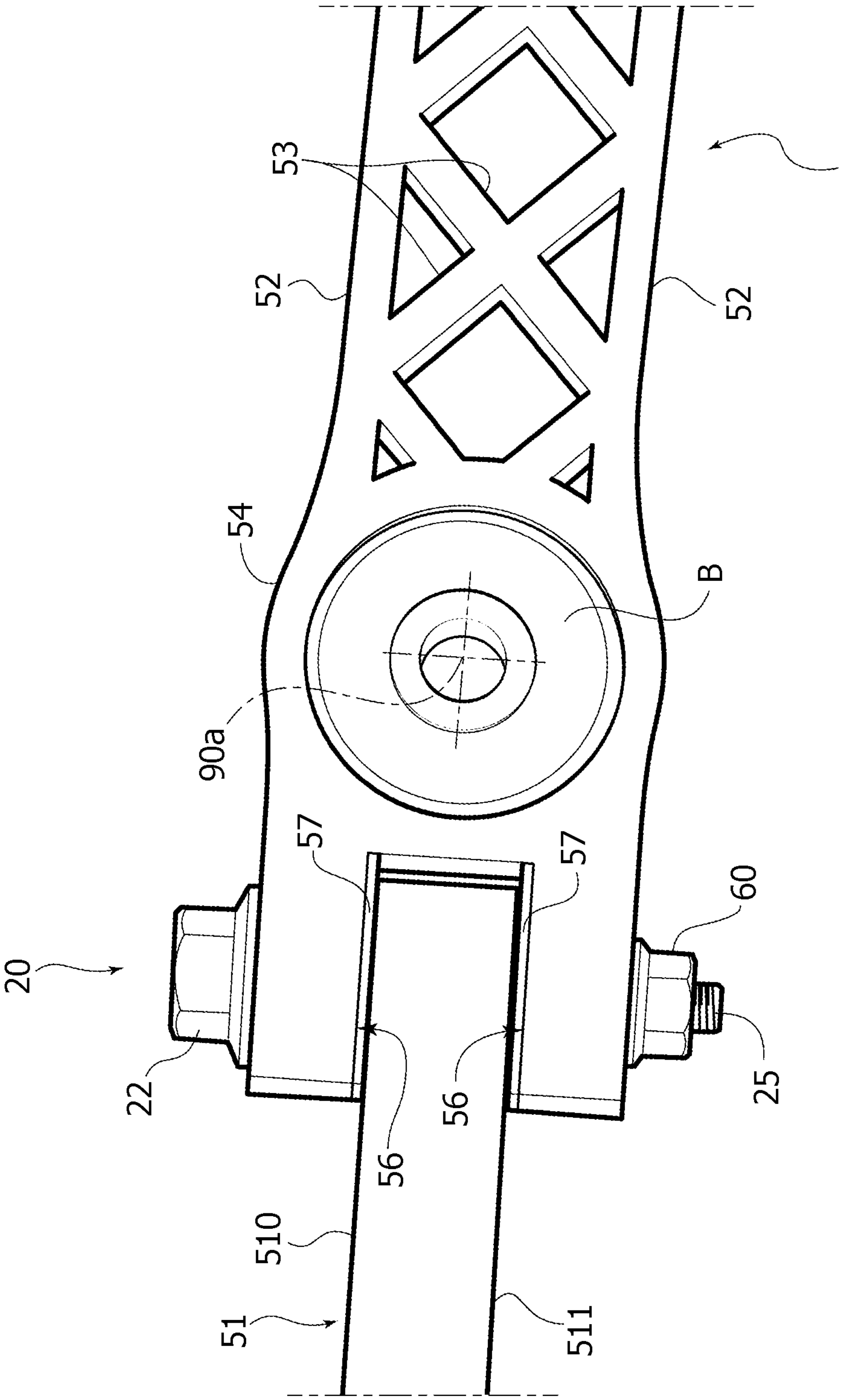
FIG. 4 is a view at an enlarged scale of a particular of FIG. 3.
Figure 5:
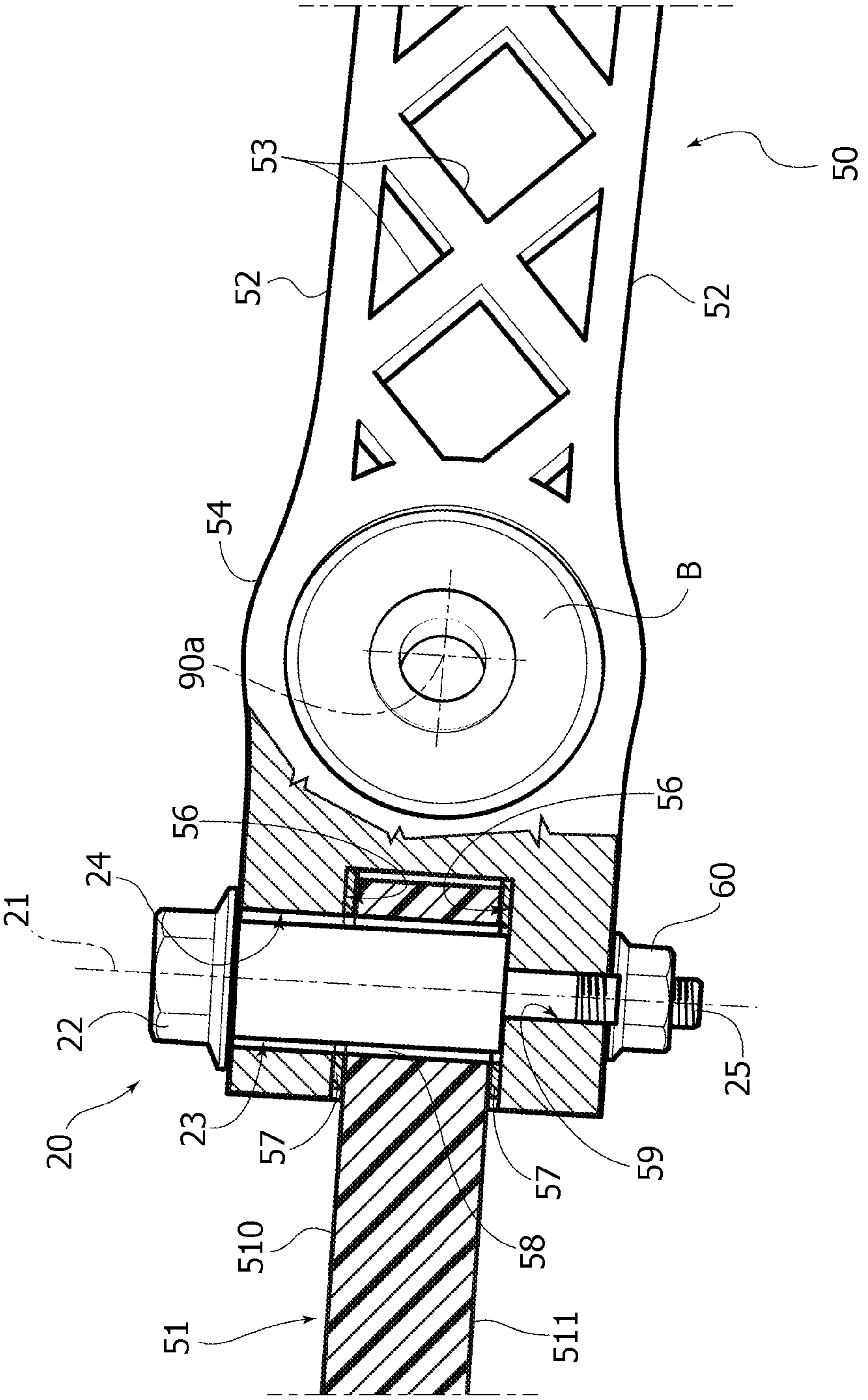
FIG. 5 is a cross-sectional view of the particular of FIG. 4.

With reference to FIGS. 3-5, in the case of said example of embodiment the innermost end of each transverse arm 50 extends beyond the axis of the respective articulation bushing B with a forklike portion 55 defining two substantially horizontal parallel plane surfaces 56 set apart from one another.

The leaf spring 51 is constituted, in the example of embodiment illustrated herein, by a single element made of composite material including a matrix of synthetic material containing reinforcement fibers, in particular glass fibers. The body of composite material constituting the leaf spring 51 has an elongated conformation with rectangular cross section, with a top surface 510 and a bottom surface 511. Of course, the material, configuration, and structure of the leaf spring 50 could even be altogether different from the ones illustrated herein purely by way of example. In particular, not at all ruled out is the possibility of using for said purpose one or more laminas made of metal material.

As is clearly visible in FIGS. 4, 5, each end of the leaf spring 51 is received within the seat defined between the two plane facing surfaces 56 of the forklike portion 55 of the respective transverse arm 50. Likewise, as may be seen in said figures, set between the surfaces 56 and the top and bottom surfaces 510, 511 of the leaf spring 51 are thin laminas 57 made of a material with a low coefficient of friction, for example, PTFE. The connection between each end of the leaf spring 50 and the forklike portion 55 of the respective transverse arm 50 is secured by a screw 20 having a substantially vertical axis 21. As may be seen in FIG. 5, the screw 20 has a head 22 that rests on the top surface of the forklike portion 55 of the transverse arm 50. The screw 20 moreover has a portion of larger diameter 23, which engages a circular hole 24 made in the branch of the forklike portion 55 on which the head 22 of the screw rests. The cylindrical portion 23 moreover engages corresponding holes provided in the two laminas 57 made of material with a low coefficient of friction and in the respective end of the leaf spring 50. However, the hole made in the leaf spring 50, which is designated by the reference number 58, is in cross section shaped like an elongated slot having a maximum dimension in the longitudinal direction of the leaf spring 50 that is greater than the diameter of the cylindrical portion 23 of the screw 20. Thanks to said arrangement, the connection described here enables minor relative movements between the leaf spring 51 and the transverse arm 50 in the longitudinal direction of the leaf spring.

The cylindrical portion of larger diameter 23 of the screw 20 bears upon the plane surface 56 defined by the bottom branch of the forklike portion 55. Said cylindrical portion 23 extends with a threaded stem 25, of smaller diameter, which is inserted through a circular hole 59 made in the bottom branch of the forklike portion 55 and is engaged by a locknut 60.

As may be seen, the portion of larger diameter 23 of the body of the screw functions as spacer element and is of a length determined in such a way as to exert a controlled pressure of contact between the branches of the forklike portion 55, the laminas 57 made of material with low coefficient of friction, and the top and bottom surfaces of the leaf spring 51. In this way, when the locknut 60 is tightened the desired effect of slotting of the leaf spring 51 in the seat of the arm 50 is obtained.

As may be seen, the connection between each end of the leaf spring 51 and the respective transverse arm 50 is such that the movements of oscillation of the transverse arms 50 in the transverse vertical plane cause a deformation of bending of the leaf spring 51 in said plane. At the same time, the transverse arms 50 can each oscillate in the horizontal plane with respect to the leaf spring 51, about the axis 21 of the respective screw 20. During the deformations due to bending of the spring 51 caused by the movements of oscillation of the transverse arms 50, the slotted holes 57 enable minor movements of relative sliding between the leaf spring 51 and the arm 50 in the longitudinal direction of the leaf spring 51 and of the arm 50.

As already mentioned above, the elastic bushings B can be of any known, conventional, type.

Figure 6:
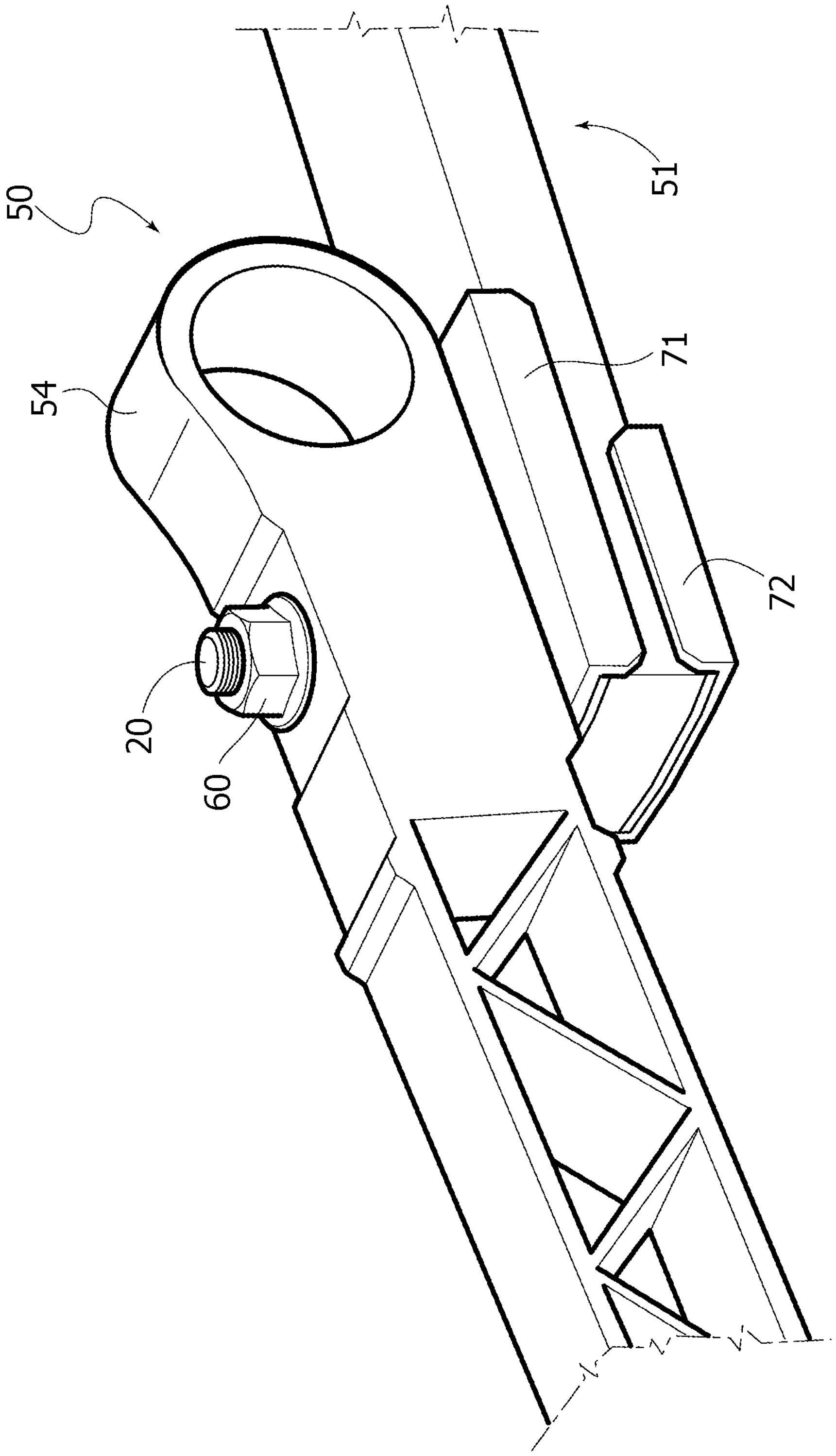
FIG. 6 illustrates a further preferred embodiment of the invention, with reference to the detail of the connection between each control arm and the leaf spring.
Figure 7:
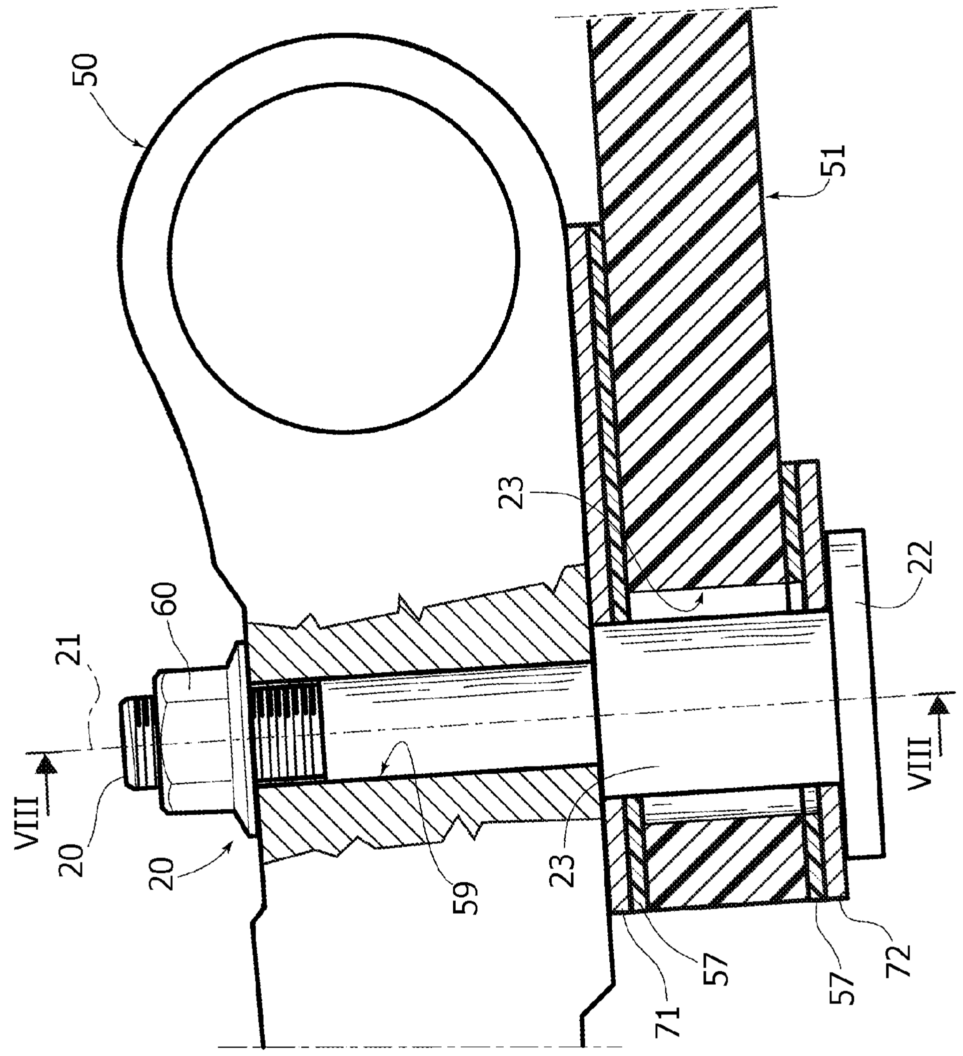
FIG. 7 is a cross-sectional view of the detail of FIG. 6.
Figure 8:
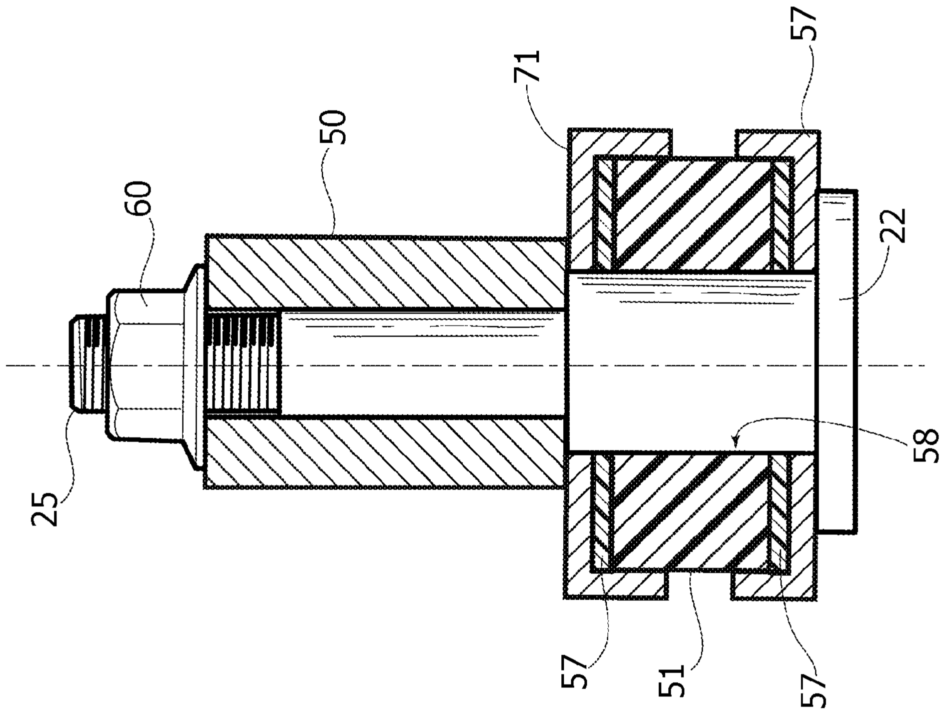
FIG. 8 is a cross section according to the line VIII-VIII of FIG. 7.

In the case of the variant of FIGS. 6-8 (where the parts corresponding to the ones illustrated in FIGS. 4 and 5 are designated by the same reference numbers), each arm 50 has its widened end that terminates with the circular portion 54, and the screw 20 is located before said end. It grips the arm 50 to the leaf spring 51 (see also FIGS. 7, 8), gripping the leaf spring 51 between two aluminium plates 71, 72 and between the two PTFE laminas 57.

Thanks to the arrangements described above, the suspension system according to the invention, in all its embodiments, enables the kinematic and structural function to be performed by the two transverse metal arms 50 in a way altogether similar to conventional suspensions with transverse arms. The particular anti-friction coupling between the leaf spring 51 and the arms 50 enables complete decoupling of the longitudinal movements of the wheel, which lead to rotation in the horizontal plane of the arms 50 with respect to the deformation of the leaf spring 51 in the horizontal plane as a result of rotation of the arms 50 about the axis 21 of each tightening screw 20. Said rotation thus occurs without any significant moments of reaction and hence without any conditioning that might penalize travelling comfort.

As has already been mentioned previously, the coupling described above also enables creation of permanent inclinations in the horizontal plane between the arms 50 and the leaf spring 51, without any moment of reaction, guaranteeing elasto-kinematic optimization of the geometry of the suspension and compatibility with the presence of other objects occupying space (for example, a rear differential in the case of a rear suspension in a motor vehicle with rear-wheel drive or four-wheel drive).

Finally, the movements of deflection of the leaf spring 51 in the vertical plane are absolutely uncoupled from the loads acting along the axis of the transverse arms 50, thus rendering the vertical stiffness of the suspension independent of the lateral loads applied in the plane of the road. Furthermore, the sizing of the leaf spring does not have to take into account the end loads on the arms that are discharged directly on the articulated connections to the supporting structure 9 of the motor vehicle.

Further advantages of the suspension system according to the invention have already been described above.

As is evident from the foregoing description, the suspension according to the invention can be adopted both for a front suspension and for a rear suspension of a motor vehicle.

Of course, without prejudice to the principle of the invention, the details of construction and the embodiments may vary widely with respect to what has been described and illustrated herein purely by way of example, without thereby departing from the scope of the present invention.

What is claimed is:

1. A motor-vehicle suspension system, comprising, for each wheel, at least one transverse control arm having an outermost end connected in an articulated way to a respective wheel support and an innermost end connected in an articulated way to a supporting structure of the motor vehicle in such a way that each transverse control arm guides the vertical movements of the respective wheel support by means of an oscillation in a plane that is substantially transverse with respect to the longitudinal direction of the motor vehicle, said system further comprising spring means that counter the vertical movements of the two wheel supports, constituted by a leaf spring set transversely with respect to the longitudinal direction of the motor vehicle, and constituting a unit separate from said transverse control arms, wherein said leaf spring is set centrally between said transverse control arms, with the end of the leaf spring connected to the innermost ends of said transverse control arms in such a way that the oscillations of the transverse control arms in the aforesaid substantially transverse plane cause a deformation of bending of the leaf spring, the connection of each transverse arm to the leaf spring being such as to enable rotations of the transverse control arm in a substantially horizontal plane with respect to the leaf spring and relative sliding between the connected ends of the arm and of the leaf spring in the longitudinal direction of the leaf spring.

2. The suspension system according to claim 1, wherein said leaf spring has a body made of a single piece of composite material, comprising a matrix of plastic material containing reinforcement fibers.

3. The suspension system according to claim 1, wherein each transverse arm is made of metal material.

4. The suspension system according to claim 3, wherein each transverse arm has a body made of a single piece of aluminium obtained by extrusion.

5. The suspension system according to claim 1, wherein the transverse arms have their connected ends in an articulated way about axes substantially parallel to the longitudinal direction of the motor vehicle, with the aid of elastic bushings that enable minor angular oscillations principally about the axis of the bushing and relative displacements along axes directed transversely to the axis of the bushing.

6. The suspension system according to claim 1, wherein the ends of the leaf spring are connected to the innermost ends of the transverse arms each with the aid of a connection screw having a substantially vertical axis, so as to connect the transverse arms and the leaf spring with respect to the movements of oscillation of the arms that bring about a deformation of bending of the leaf spring in the transverse vertical plane, at the same time enabling a relative rotation between each transverse arm and the spring about the axis of the respective connection screw.

7. The suspension system according to claim 6, wherein each of said connection screws engages corresponding holes made in the respective transverse arm and in the leaf spring, at least one of said holes being elongated in the longitudinal direction of the leaf spring, to enable the aforesaid relative sliding between the connected ends of the arm and of the leaf spring in the longitudinal direction of the leaf spring.

8. The suspension system according to claim 7, wherein each transverse arm has its innermost end having a forklike portion extending beyond the axis of articulation of the arm to the frame of the motor vehicle and defining two parallel plane surfaces set apart, received between which is the corresponding end of the leaf spring.

9. The suspension system according to claim 7, wherein each transverse arm has its innermost end set on top of the corresponding end of the leaf spring and fixed thereto by means of said connection screw, with the interposition of two metal plates having two respective parallel plane surfaces in contact with opposite faces of the leaf spring.

10. The suspension system according to claim 8, wherein said leaf spring has a substantially rectangular cross section, with a top plane surface and a bottom plane surface that engage with said parallel plane surfaces set apart at the innermost end of each transverse arm.

11. The suspension system according to claim 10, wherein set between said parallel plane surfaces set apart and the top and bottom plane surfaces of the leaf spring are laminas made of a material with a low coefficient of friction.

12. The suspension system according to claim 11, wherein the material with a low coefficient of friction is PTFE.

13. A motor-vehicle suspension system, comprising, for each wheel, at least one transverse control arm having an outermost end connected in an articulated way to a respective wheel support and an innermost end connected in an articulated way to a supporting structure of the motor vehicle in such a way that each transverse control arm guides the vertical movements of the respective wheel support by means of an oscillation in a plane that is substantially transverse with respect to the longitudinal direction of the motor vehicle, said system further comprising spring means that counter the vertical movements of the two wheel supports, constituted by a leaf spring set transversely with respect to the longitudinal direction of the motor vehicle, and constituting a unit separate from said transverse control arms, wherein said leaf spring is set centrally between said transverse control arms, with the end of the leaf spring connected to the innermost ends of said transverse control arms in such a way that the oscillations of the transverse control arms in the aforesaid substantially transverse plane cause a deformation of bending of the leaf spring, the connection of each transverse arm to the leaf spring being such as to enable rotations of the transverse control arm in a substantially horizontal plane with respect to the leaf spring and relative sliding between the connected ends of the arm and of the leaf spring in the longitudinal direction of the leaf spring, and wherein said leaf spring has a body made of a single piece of composite material, comprising a matrix of plastic material containing reinforcement fibers.

14. The suspension system according to claim 13, wherein each transverse arm is made of metal material.

15. The suspension system according to claim 14, wherein each transverse arm has a body made of a single piece of aluminium obtained by extrusion.

16. The suspension system according to claim 13, wherein the transverse arms have their connected ends in an articulated way about axes substantially parallel to the longitudinal direction of the motor vehicle, with the aid of elastic bushings that enable minor angular oscillations principally about the axis of the bushing and relative displacements along axes directed transversely to the axis of the bushing.

17. The suspension system according to claim 13, wherein the ends of the leaf spring are connected to the innermost ends of the transverse arms each with the aid of a connection screw having a substantially vertical axis, so as to connect the transverse arms and the leaf spring with respect to the movements of oscillation of the arms that bring about a deformation of bending of the leaf spring in the transverse vertical plane, at the same time enabling a relative rotation between each transverse arm and the spring about the axis of the respective connection screw.

18. The suspension system according to claim 17, wherein each of said connection screws engages corresponding holes made in the respective transverse arm and in the leaf spring, at least one of said holes being elongated in the longitudinal direction of the leaf spring, to enable the aforesaid relative sliding between the connected ends of the arm and of the leaf spring in the longitudinal direction of the leaf spring.

19. The suspension system according to claim 18, wherein each transverse arm has its innermost end having a forklike portion extending beyond the axis of articulation of the arm to the frame of the motor vehicle and defining two parallel plane surfaces set apart, received between which is the corresponding end of the leaf spring.

20. The suspension system according to claim 18, wherein each transverse arm has its innermost end set on top of the corresponding end of the leaf spring and fixed thereto by means of said connection screw, with the interposition of two metal plates having two respective parallel plane surfaces in contact with opposite faces of the leaf spring.

21. The suspension system according to claim 19, wherein said leaf spring has a substantially rectangular cross section, with a top plane surface and a bottom plane surface that engage with said parallel plane surfaces set apart at the innermost end of each transverse arm.

22. The suspension system according to claim 21, wherein set between said parallel plane surfaces set apart and the top and bottom plane surfaces of the leaf spring are laminas made of a material with a low coefficient of friction.

23. The suspension system according to claim 22, wherein the material with a low coefficient of friction is PTFE.

* * * * *